July 7, 1936.  C. E. REED  2,047,116
ROTARY EARTH BORING DRILL
Filed May 16, 1933　　2 Sheets-Sheet 1
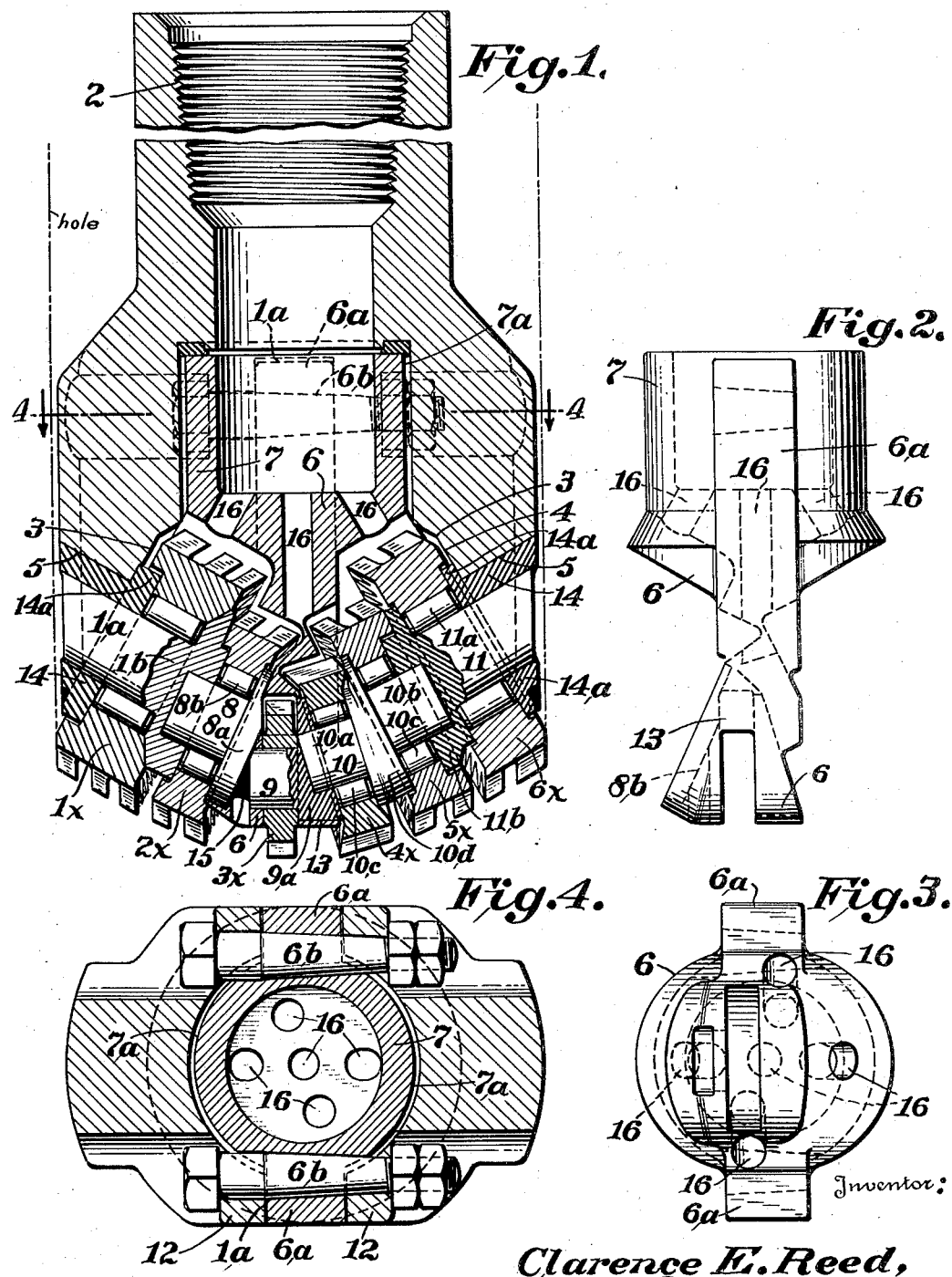
Inventor:
Clarence E. Reed,
By Spear, Donaldson & Hall
Attorneys

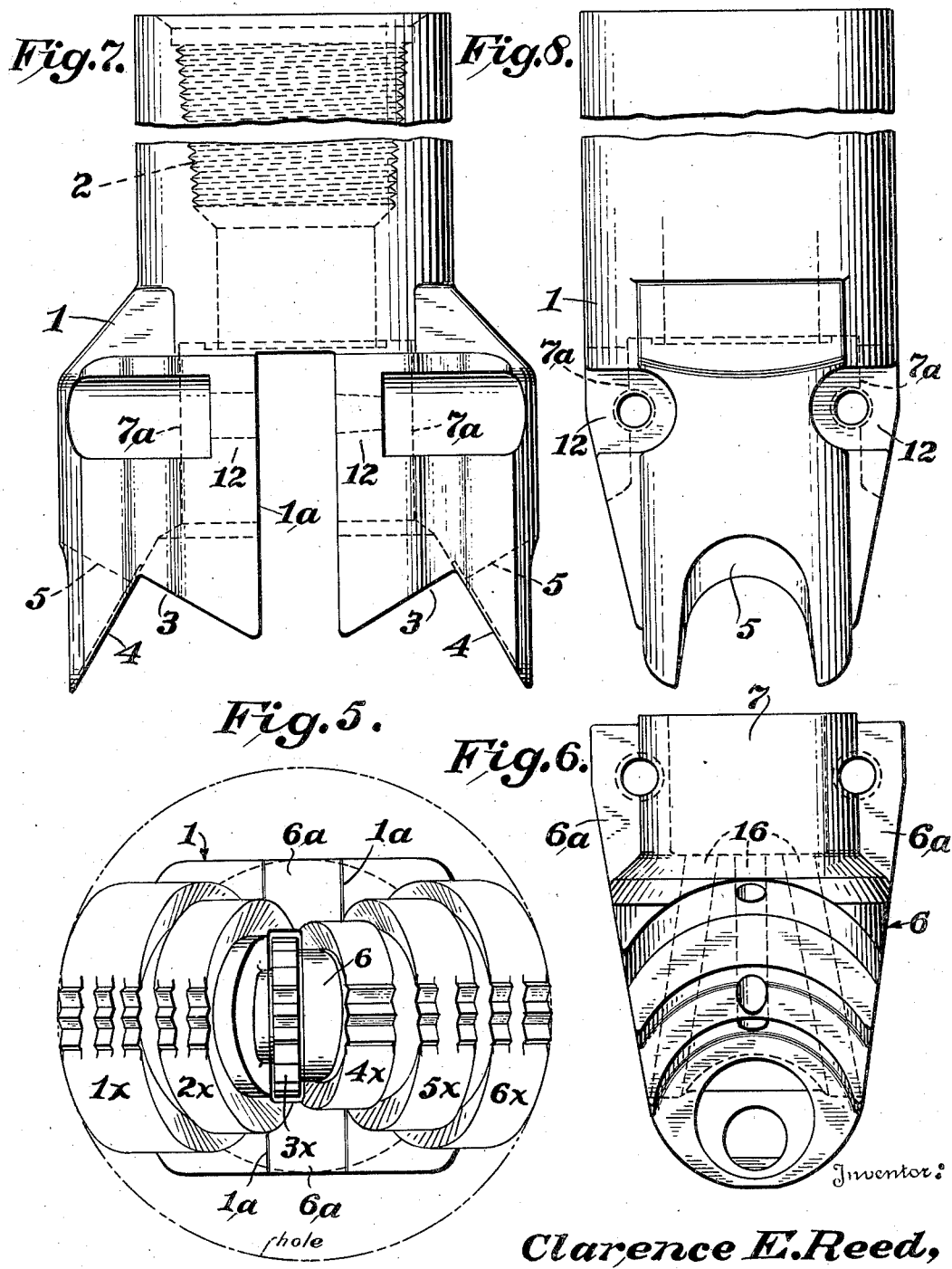

Patented July 7, 1936

2,047,116

UNITED STATES PATENT OFFICE 2,047,116

ROTARY EARTH BORING DRILL

Clarence E. Reed, Wichita, Kans., assignor to Chicago Pneumatic Tool Company, New York, N. Y., a corporation of New Jersey Application May 16, 1933, Serial No. 671,384

6 Claims. (Cl. 255—71)

The invention concerns rotary earth boring drills of the general type in which rotary toothed cutters are mounted on a carrier member connected with a bit head and are adapted to drill by contacting with the earth formation during rotary movement of the bit head.

The invention concerns the features and combination and arrangement of parts hereinafter described and particularly pointed out in the claims.

In the accompanying drawings

Figure 1 is a vertical sectional view of the bit head and roller cutter organization.

Fig. 2 is a side elevation of the cutter carrier member.

Fig. 3 is a bottom view of the cutter carrier.

Fig. 4 is a sectional view on line 4—4 of Fig. 1.

Fig. 5 is a bottom plan view of the drill, the cutters mostly being indicated diagrammatically.

Fig. 6 is a side view of the cutter carrier looking from the right of Fig. 2.

Fig. 7 is a side view of the bit head.

Fig. 8 is an end view of the bit head.

In the drawings 1 indicates the bit head having means at 2 for attachment to a drill stem or drill tube. This head has a recess 3 defined by depending walls with divergent inner faces 4 and approximately vertical outer walls. These depending walls have notches 5 in their lower ends. Within this flaring recess is located a roller cutter organization comprising a carrier member 6 having a cylindrical upper stem portion 7 fitting into a socket 7a within the bit head above the flaring recess 3 and communicating therewith. This cutter carrier is provided on its outer sides with lugs or wings 6a fitting into slots or notches 1a in the wall of the socket at opposite points thereon, said slots being open at their lower ends so that by moving the carrier up into the bit head the lugs 6a will enter said slots wherein they are retained by bolts 6b at the outer sides of the bit head where they are mounted in perforated lugs or portions 12 of the bit head, said bolts lying in openings in the lugs 6a and 12. The cutter carrier includes a body portion 13 of triangular cross sectional shape. From the upwardly converging sides of this body portion spindles project in opposite directions. These spindles are indicated at 8 and 10. The spindle 8 has a flange or head 8a fitting into a recess 8b in the triangular carrier body portion. The spindle 10 fits into a socket in a flange or head 9a of a spindle 9, which is arranged with its axis horizontal and is mounted in the carrier. On this horizontally arranged spindle is mounted a roller cutter 3x for cutting at the bottom of the hole at one side of the vertical axis of the drill.

The spindle 10 is of composite form, including the portion 10a seated in the socket in the head or flange of the spindle 9 and a portion 10b arranged eccentric to the portion 10a and having its axis at an acute angle to the axis of the portion 10a. Each of the portions 10a, 10b has a roller cutter mounted thereon as shown at 4x and 5x. These roller cutters have roller bearings 10c. Between these roller cutters 4x and 5x is a flange 10d broad at its lower end and with its opposite sides converging upwardly.

The roller bearings are held in place, in part by this flange.

By reason of the relation of the spindle portions 10a, 10b with their axes at an acute angle to each other, the cutters 4x and 5x rotate in planes at an acute angle to each other. A third spindle 11 is mounted in part on the end of the spindle portion 10b and with its axis at an acute angle to the axes of the spindle portions 10a, 10b. The spindle 11 has a socket 11a receiving the end of the spindle portion 10b. The spindle 11 has a flange 11b which furnishes a side bearing for the roller cutters 5x and 6x. This cutter 6x is mounted on anti-friction rollers. The spindle 11 bears at its end in a bushing 14 which is fitted within the notch 5 at the lower end of the depending wall of the bit head. The cutter 6x rotates in a plane at an acute angle to the planes in which the roller cutters 4x and 5x work, so that the roller cutters all diverge downwardly in respect to each other. The bushing 14 has a flange 14a bearing on the inner side of the depending wall of the bit head. This flange also provides a side bearing for the roller cutter 6x. The three roller cutters 4x, 5x and 6x are located on one side of the vertical axis of the drill.

The roller cutters on the opposite side of the vertical axis of the bit head from the location of the three cutters above mentioned, comprise two cutters, 1x and 2x. The roller cutter 1x is mounted on roller bearings carried by a spindle 1a between a flange or head 1b of said spindle and the flange 14a of the bushing or wear member 14 located in the notch at the lower end of the depending wall of the bit head. The head or flange 1b of the spindle 1a is provided with a socket which receives the spindle 8 of the roller cutter 2x, which is mounted on roller bearings located between the flange or head 1b of spindle 1a, and the flange 8a of spindle 8.

The head or flange 8a is located in a recess 8b of the cutter carrier member wherein it may be secured by welding at 15, which welding may also secure the spindle 9 in place. The spindles 1a and 8 have their axes at an acute angle to each other. The spindles 1a and 8, however, incline upwardly in the same general direction, and this is true also of the spindles 10, and 11, and the spindle portions 10a and 10b of the spindle 10. In other words, all the spindles incline upwardly from the body of the carrier member, and they virtually form an inverted arch shaped structure, the ends of the arch being anchored in the bushings 14 located in the notches 5 of the depending walls of the bit head.

Similar to the arrangement of the roller cutters 4x, 5x and 6x in downwardly divergent relation each other, the cutters 1x and 2x also are related to each other in a downwardly divergent position. This arrangement distributes the lower cutting edges of the roller cutters at proper distances apart across the diameter of the bore hole. The cutters may be arranged with their axes all in the same vertical plane. The spindles may be connected to each other by the projecting end of one spindle fitting into a socket in the adjacent spindle, or the sockets may be screw threaded to receive the adjacent spindle.

This drill is intended primarily for rapid penetration of shale formations and so-called soft earth formations. To this end the roller cutters each have wide and deep concentric grooves intersected by the cross grooves between the teeth.

Suitable flushing fluid passages 16 are employed for flushing the cutters.

The bit head is longer than wide, as shown in Fig. 3, in that portion thereof which contains the roller cutter organization. The length of this portion of the bit head is as represented in Fig. 1. The width of the lower part of the bit head is less than the diameter of the roller cutters. This lower part of the bit head is open laterally intermediate the flaring end walls 4—4. The various rollers rotate independently. The rollers decrease in diameter from the outermost to the innermost, and each rotates at the speed corresponding to the requirements of its position.

I do not limit myself to the arrangement of cutters extending from side to side of the bit head with their axes all in the same vertical plane, except as may be specifically included in certain of the claims. Nor do I limit myself to the particular form and arrangement of the parts, except as pointed out particularly in the appended claims which define the scope of the invention.

Certain features herein disclosed relating to the bearing and spindle structure for the cutters, and the cutter arrangement, are claimed in co-pending application Serial No. 672,317, filed May 22, 1933.

I claim:

1. In combination in an earth boring drill, a bit head, side cutters cutting an area at the side of the hole including clearance for the bit head rotating in planes convergent upwardly in the bit head and substantially tracking each other, and other inclined cutters intermediate the side cutters, inclined to each other at an acute angle and in planes convergent upwardly, said intermediate cutters contacting the entire area at the bottom of the hole intermediate the side cutters, the sides of all of said cutters facing each other, substantially as described.

2. A roller cutter organization for an earth boring drill comprising a series of roller cutters positioned side by side from end to end of the organization, and having their axes inclined to each other at an acute angle, the cutters rotating in planes convergent upwardly, a series of spindle portions having flanges, and interfitting together by a socket and projecting end engagement of the spindle portions for supporting the roller cutters including inclined side cutters.

3. A roller cutter organization according to claim 2, in which each cutter is mounted for independent rotation.

4. A roller cutter organization according to claim 2 in which roller bearings are arranged on and between the spindles and their respective cutters.

5. A roller cutter organization for earth boring drills comprising a carrier member, spindles projecting from opposite side of said carrier and inclining upwardly and outwardly, and other spindles connected with the spindles first mentioned, and inclining upwardly and outwardly at a greater inclination than the spindles first mentioned, the outermost spindles being adapted to be seated in the walls of a bit head, and rotary cutters on the spindles working in planes convergent upwardly by reason of the relative inclined positions of the spindles, substantially as described.

6. In combination in an earth boring drill, a bit head, a roller cutter organization comprising a plurality of rotary cutters disposed in a group to one side of the drill axis and all arranged side by side in planes inclined to the horizontal and convergent upwardly in the bit head, said cutters cutting entirely on the bottom of the hole below the drill from substantially the drill axis to beyond the bit head to provide clearance therefor, and an inclined roller cutter on the opposite side of the drill axis from said group and tracking the outermost portion of the area cut by said group, all of said cutter axes lying in a plane passing through the bit head axis.

CLARENCE E. REED.